US012620933B2

(12) United States Patent
Buscemi

(10) Patent No.: US 12,620,933 B2
(45) Date of Patent: May 5, 2026

(54) METHOD FOR FORECASTING ELECTRICAL POWER IN REAL TIME OF A PHOTOVOLTAIC PLANT

(71) Applicants: AVATR S.R.L. Startup Costituita Ai Sensi Dell'art. 4 Comma 10 Bis D.L. 3/2015 Conv. Con Legge 33/2015, Rome (IT); Alessandro Buscemi, Altavilla Milicia (IT)

(72) Inventor: Alessandro Buscemi, Altavilla Milicia (IT)

(73) Assignees: Alessandro Buscemi, Altavilla Milicia (IT); AVATR S.R.L. STARTUP COSTITUITA AI SENSI DELL'ART. 4 COMMA 10 BIS D.L. 3/2015 CONV. CON LEGGE 33/2015, Rome (IT)

( * ) Notice: Subject to any disclaimer, the term of this patent is extended or adjusted under 35 U.S.C. 154(b) by 347 days.

(21) Appl. No.: 18/262,492

(22) PCT Filed: Jan. 17, 2022

(86) PCT No.: PCT/IB2022/050343
§ 371 (c)(1),
(2) Date: Jul. 21, 2023

(87) PCT Pub. No.: WO2022/157612
PCT Pub. Date: Jul. 28, 2022

(65) Prior Publication Data
US 2024/0079996 A1 Mar. 7, 2024

(30) Foreign Application Priority Data
Jan. 25, 2021 (IT) ........................ 102021000001346

(51) Int. Cl.
*H02S 50/10* (2014.01)
*G06Q 10/04* (2023.01)
(Continued)

(52) U.S. Cl.
CPC ............. *H02S 50/10* (2014.12); *G06Q 10/04* (2013.01); *G06Q 10/06393* (2013.01); *H02S 40/32* (2014.12)

(58) Field of Classification Search
CPC ....... G06Q 10/04; Y04S 10/123; Y04S 10/52; H02S 20/32; H02S 50/00; H02S 50/10; H02S 50/90
See application file for complete search history.

(56) References Cited

U.S. PATENT DOCUMENTS

2011/0066401 A1* 3/2011 Yang ..................... G01J 1/4228
702/183
2011/0307109 A1* 12/2011 Sri-Jayantha .......... G06Q 10/04
700/291
(Continued)

FOREIGN PATENT DOCUMENTS

EP 2528103 A1 11/2012
EP 3128635 A1 2/2017

OTHER PUBLICATIONS

International Search Report dated Feb. 10, 2022 from counterpart PCT App No. PCT/IB2022/050343.

*Primary Examiner* — Nicholas Klicos
(74) *Attorney, Agent, or Firm* — SHUTTLEWORTH & INGERSOLL, PLC; Timothy J. Klima

(57) ABSTRACT

A is a method for forecasting electrical power in real time of a photovoltaic plant includes recording a set of operating data; entering for each set of operating data a respective electrical power value recorded in a cell for insertion of a power matrix and dividing the recorded electrical power value to obtain an efficiency value. The efficiency value in (Continued)

a cell of an efficiency matrix is entered and a power value contained in a cell of the power matrix and an efficiency value contained in a cell of the efficiency matrix identified. The power value and the efficiency value are multiplied to derive an expected electrical power value and the expected electrical power value is compared with the corresponding electrical power value acquired in real time identifying an operating condition of the photovoltaic plant as a function of the comparison.

9 Claims, 3 Drawing Sheets

(51) Int. Cl.
    *G06Q 10/0639*     (2023.01)
    *H02S 40/32*     (2014.01)

(56)              References Cited

U.S. PATENT DOCUMENTS

| 2014/0149038 | A1* | 5/2014 | Cronin | G01W 1/10 |
| | | | | 702/3 |
| 2014/0175260 | A1* | 6/2014 | Futakuchi | F24S 50/20 |
| | | | | 136/246 |
| 2015/0134251 | A1* | 5/2015 | Bixel | G01W 1/12 |
| | | | | 700/287 |
| 2016/0359453 | A1* | 12/2016 | Jones | G01N 21/94 |
| 2017/0212156 | A1* | 7/2017 | Dang | G01J 1/42 |
| 2019/0332073 | A1* | 10/2019 | Nasle | G06Q 30/0206 |

* cited by examiner

Fig. 2A

METHOD FOR FORECASTING ELECTRICAL POWER IN REAL TIME OF A PHOTOVOLTAIC PLANT

This application is the National Phase of International Application PCT/IB2022/050343 filed Jan. 17, 2022 which designated the U.S.

This application claims priority to Italian Patent Application No. 102021000001346 filed Jan. 25, 2021, which applications are incorporated by reference herein.

This invention relates to a method for analysing and forecasting in real time the electrical power of a photovoltaic plant which is widely used in the field of renewable energy, in particular in the field of solar energy.

A photovoltaic plant is an electricity plant equipped with a solar energy collection system which uses photovoltaic modules and produces electricity.

It is known that photovoltaic modules are subject to temporary or permanent drops in efficiency in the production of electrical power due to different factors such as, for example, temperature variations, amounts of dirt of the surface areas, total or partial breakages of the modules, total and partial shading, spontaneous deterioration of the modules, environmental conditions and the like.

Currently, the need is particularly felt for monitoring the production of electrical power of the photovoltaic plants in such a way as to monitor their production of energy in order to better manage the request and the demand for the energy market and in such a way as to better manage the economic aspects of the plants. For this purpose, there are prior art systems and methods which are able to collect data which can be detected by the photovoltaic plant for providing a function of simple display or statistical processing of the data.

Disadvantageously, many of the monitoring systems currently used are able to identify faults and malfunctions of the various components of the plant (modules and inverters) but are not able to measure efficiency drops linked to the variations of the ambient conditions of the plant such as, for example, the effect of the presence of shading on the modules.

Disadvantageously, the prior art systems are not able to automatically perform the calibration and the checking of accuracy of the models for forecasting the electrical power at the output from the plant without the aid of operators who can carry out technical and statistical analyses of the data collected by the plant.

Disadvantageously, the prior art methods are not able to automatically detect the effect of shading by buildings or vegetation on the efficiency of the plant as a function of the position of the sun or are not able to determine the lack of electrical production due to the presence of snow covering on the modules.

The technical purpose of the invention is therefore to provide a method for forecasting in real time the electrical power of a photovoltaic plant which is able to overcome some of the drawbacks of the prior art including the possibility of taking into account the effect of shading on the efficiency of the photovoltaic plant.

The aim of the invention is therefore to provide a method for forecasting in real time the electrical power of a photovoltaic plant which is automated and fast.

A further aim of the invention is to provide a method for forecasting in real time the electrical power of a photovoltaic plant which can be easily implemented.

A further aim of the invention is to provide a method for forecasting in real time the electrical power of a photovoltaic plant which is able to forecast the electrical power of the photovoltaic plant in an efficient and reliable manner.

A further aim of the invention is to provide a method for forecasting in real time the electrical power of a photovoltaic plant which is able to derive information regarding the presence and the energy impact of any malfunction or decrease of performance not highlighted by faults detected by the traditional systems for monitoring the plants.

The technical purpose indicated and the aims specified are substantially achieved by a method for forecasting in real time the electrical power of a photovoltaic plant comprising the technical features described in one or more of the appended claims. The dependent claims correspond to possible embodiments of the invention.

Further features and advantages of the invention are more apparent in the non-limiting description which follows of a non-exclusive embodiment of a method for forecasting in real time the electrical power of a photovoltaic plant.

The description is set out below with reference to the accompanying drawings which are provided solely for purposes of illustration without restricting the scope of the invention and in which:

FIGS. 2A and 2B show respective approximate reconstructions of power and efficiency functions.

Figure 1:
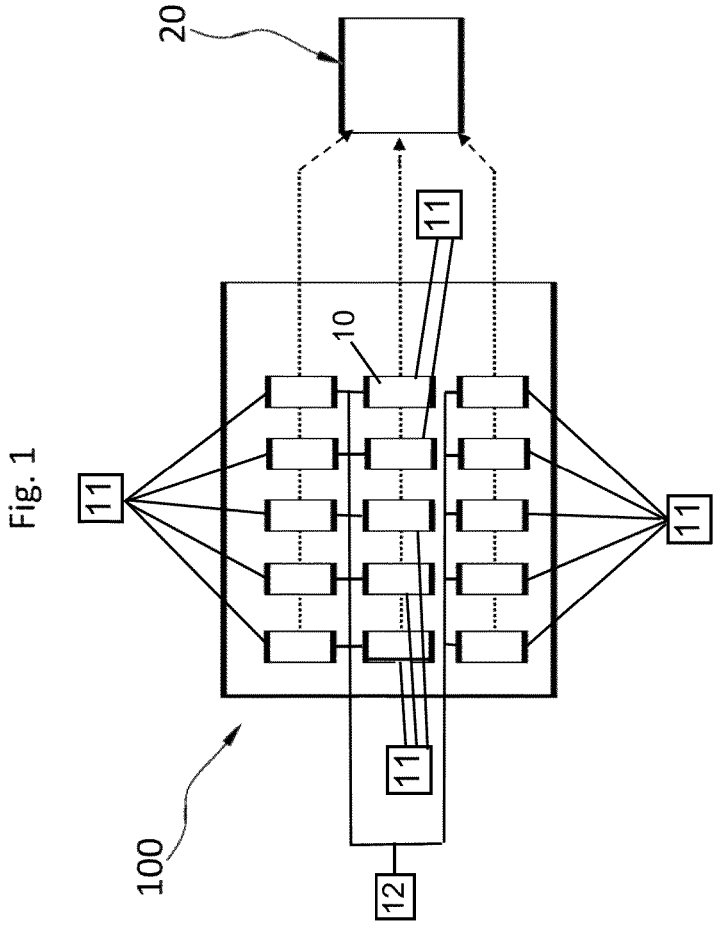
FIG. 1 is a plan diagram of a photovoltaic plant.

With reference to the accompanying drawings, the numeral 100 denotes a photovoltaic plant comprising a plurality of modules 10 interconnected with each other.

The modules 10 may be connected to each other according to connections in series or in parallel.

In particular, the modules 10 are divided into groups in such a way that each unit is connected to a respective inverter (not illustrated) of the photovoltaic plant 100.

The photovoltaic plant 100 comprises a plurality of sensors. According to a possible embodiment, the photovoltaic plant 100 comprises a minimum temperature sensor for the entire photovoltaic plant 100.

According to the preferred embodiment, the plant has at least one temperature sensor for each group of modules 10 connected to the same inverter configured for acquiring data relating to a temperature $T_{mod}$ and a solar radiation sensor which is positioned in the photovoltaic plant 100 in such a way as to never be affected by shading and configured to acquire data relating to solar radiation G.

The photovoltaic plant 100 also comprises at least one electrical counter for acquiring an electrical power $P_m$ during an operating period of time of the photovoltaic plant 100.

Preferably, the entire photovoltaic plant 100 is associated with various global solar radiation sensors G installed on different parts of the plant 100 which must never be affected by shading during a period of time of operation of the photovoltaic plant 100.

Preferably, each inverter of the photovoltaic plant 100 is associated with at least one electric counter which determines the electrical power $P_m$ of each inverter.

Preferably, each group of modules 10 connected to an inverter 10 of the photovoltaic plant 100 is associated with at least one sensor (not illustrated) configured to acquire an average temperature of the modules $T_{mod}$.

In particular, the sensors detect and acquire operating data G, $T_{mod}$, $P_m$ of the photovoltaic plant 100 and send the data to a processing and control unit 20 which processes it and determine the values of further operating data $\pi$, $\nu$ by means of an astronomical algorithm for positioning the sun.

Preferably, the processing and control unit 20 is also able to receive and process data relating to the photovoltaic plant 100 inserted by a user and/or deriving from algorithms available in the scientific literature.

The processing and control unit 20 is configured to receive the operating data G, $T_{mod}$, $P_m$ and to process further operating data $\pi$, $v$ and to implement a method for forecasting in real time the electrical power of the photovoltaic plant 100 according to the invention.

In more detail, the method comprises a step of recording, at each predetermined time interval $\Delta t$ of a recording period $T_r$, a set of operating data G, $T_{mod}$, $\alpha$, $v$, $P_m$ of the photovoltaic plant 100.

In particular, some operating data G, $T_{mod}$, $P_m$ of the data set are acquired, at predetermined time intervals $\Delta t$, by using sensors of various types located on the modules 10 in various parts of the plant 100. Other operating data $\pi$, $v$ of the data set are, on the other hand, calculated and obtained starting from the date of acquisition of the data by means of the sensors.

Preferably, the set of operating data G, $T_{mod}$, $\alpha$, $v$, $P_m$ comprises, respectively, at least one value of: overall solar radiation G, average temperature $T_{med}$ of the modules 10 of the photovoltaic plant 100, solar height $\alpha$, solar azimuth $v$, electrical power $P_m$ at output from the photovoltaic plant 100.

Even more preferably, the data of the set of operating data acquired by the sensors are those relative to an overall solar radiation value G, average temperature $T_{med}$ of the modules 10 and electrical power $P_m$ output of the photovoltaic plant 100. The values relating to solar height $\alpha$ and solar azimuth $v$ data are calculated as a function of the date of acquisition of the data by means of sensors.

In other words, during the recording step, for each time interval $\Delta t$, a value for each operating data G, $T_{mod}$, $\alpha$, $v$, $P_m$ is recorded in such a way that the set of values consists of five values.

Considering the quantities in more detail, the overall solar radiation G is a quantity relative to an average overall solar radiation value of the site in which the photovoltaic plant 100 is located. This value can be determined both by terrestrial measurements carried out, for example, by one or more solarimeters (of the thermopile or photovoltaic effect type) or by means of satellite measurements.

If this measurement is performed by means of one or more solarimeters, the latter preferably must be installed with the same inclination as the modules 10 and must be cleaned exclusively when all the modules 10 of the photovoltaic plant 100 are washed. In this way, the surface of the sensors is characterised, with good approximation, by the same level of dirt as that of the modules 10 and it is therefore possible to minimise the effect of this factor on the acquisition of the data relating to the overall solar radiation G in the recording period $T_r$ and on the accuracy of the results of the method as described below.

Again if the measurement is performed by means of solarimeters, the latter must be cleaned periodically in the case of snowfall.

If the measurement is performed by means of thermopile sensors, they do not require constant and regular cleaning in the case of snow, since they are provided with covers designed to reduce the effects of the snowy surface.

The quantity relative to the average temperature $T_{mod}$ of the modules 10 of the photovoltaic plant 100 represents, on the other hand, an average of the temperatures values measured by temperature sensors installed on one or more modules 10 amongst those belonging to the plant 100. Alternatively, this quantity may be determined indirectly, that is to say, by means of the empirical correlations available in the scientific literature for calculating the temperature of the modules 10 as a function of the values of the weather parameters such as, for example, air temperature and wind speed. The values of the meteorological parameters can be measured, for each time interval $\Delta t$, by a meteorological station installed close to the photovoltaic plant 100.

The values relating to the solar height $\alpha$ and the solar azimuth $v$ are, on the other hand, determined, using suitable algorithms available in the scientific literature as a function of the geographical coordinates of the photovoltaic plant 100, the time of day, the day of the year and the time zone.

The quantity relative to the total electrical power $P_m$ output from the photovoltaic plant 100 is determined as the sum of the electrical powers $P_m$ measured, for each time interval $\Delta t$, by suitable counters installed in the plant at each inverter of the photovoltaic plant 100.

During the recording period $T_r$, a set of the above-mentioned quantities is recorded at each predetermined time interval $\Delta t$ in such a way that, at each interval, there is a recording of a value of overall solar radiation G, average temperature $T_m$, solar azimuth and height $v$, $\alpha$ and electrical power $P_m$.

Preferably, the recording step comprises a sub-step of storing each set of operating data G, $T_{mod}$, $\alpha$, $v$, $P_m$ in a respective row of a storage matrix S.

In this situation, the storage matrix S is a matrix in which, in each cell in a same row, there are the values corresponding to the data of the set of operating data G, $T_{mod}$, $\alpha$, $v$, $P_m$ recorded in a certain time interval $\Delta t$ by the sensors.

Preferably, for each row of the storage matrix S there is also a cell containing data relating to the date of recording the respective set of operating data G, $T_{mod}$, $\alpha$, $v$, $P_m$ and a cell containing data relating to the time in which the above-mentioned recording has been performed.

Therefore, at each new recording, a new row of the storage matrix S is filled with the operating data values G, $T_{mod}$, $\alpha$, $v$, $P_m$ relative to the set just recorded.

After the recording step, the method comprises a step of defining a plurality of conditions of acceptance of the values contained in each set of operating data G, $T_{mod}$, $\alpha$, $v$, $P_m$ recorded.

In the implementation of the method, according to the invention, it is in fact important to filter the values present in the supporting matrix "S" in order to obtain an accurate and realistic electrical power forecast.

In particular, the values contained in the supporting matrix "S" must be filtered in order to refer exclusively to conditions in which the photovoltaic plant 100 and the sensors have operated at the maximum of the possible performance levels.

The expression "maximum of the possible performance levels" means that these conditions are not correlated either to the nominal conditions declared by the manufacturer of the photovoltaic plant 100 for its various components or to any theoretical considerations, but represent empirically the maximum operating conditions of the plant 100 as constructed and in its actual operating conditions when it is not underperforming.

For this reason, the supporting matrix "S" exclude, for example, values which correspond to periods in which the modules 10 of the photovoltaic plant 100 have remained covered, even partly, by snowfalls or values which comprise periods in which faults or malfunctions occurred in one or more parts of the plant 100.

In order to exclude the unsuitable values, the method comprises a step of applying the plurality of acceptance conditions to each row of the storage matrix S to derive an acceptance or a rejection of the set of operating data G, $T_{mod}$, $\alpha$, $\nu$, $P_m$ stored in that row.

Preferably, during that step, each row of the supporting matrix "S" is checked and in particular, each value contained in that row is checked in combination with the other values of the line in order to determine whether or not the entire row is accepted.

For example, in order to check that the solar radiation sensors are not faulty and/or covered by snow, the value of the overall solar radiation G and the electrical power value P m present in the line considered are checked. If the value relating to the overall solar radiation G of the row is different from zero and the value relating to the alternating current electrical power P m is greater than zero, the acceptance conditions will be verified, no fault will be detected and the corresponding line of data of the supporting matrix S will be considered suitable. On the other hand, if the average value relating to the overall solar radiation G of the row is equal to zero but the value relating to the electric power $P_m$ with alternating current is greater than zero, the acceptance conditions will not be verified and the values contained in the cells of the supporting matrix "S" in that line will be considered unsuitable.

If the values contained in the line being verified are suitable with respect to the acceptance conditions, they are inserted in a training matrix D containing, in each row, a set of operating data G, $T_{mod}$, $\alpha$, $\nu$, $P_m$ of the storage matrix S respecting the acceptance conditions.

Alternatively, if the outcome of the check with respect to the acceptance conditions is negative, the values contained in the row, which is the object of check, of the storage matrix S are not inserted in the training matrix D.

At the end of the recording period $T_r$, the method also comprises a step of initialising a power matrix A1 and a efficiency matrix A2.

The power matrix A1 has a plurality of columns each representing an interval of overall solar radiation values G and a respective plurality of rows each representing a range of average temperature values $T_{mod}$.

The efficiency matrix A2 has, on the other hand, a plurality of columns each representing an interval of solar height values $\alpha$ and a respective plurality of rows each representing an interval of solar azimuth values $\nu$.

Preferably, in order to derive each interval, the method comprises a step of identifying a maximum value $G_{maximum}$, $T_{modmax}$, $\alpha_{max}$, $\nu_{maximum}$ and a minimum value $G_{min}$, $T_{mod\ min}$, $\alpha_{min}$, $\nu_{min}$ amongst the values present in the training matrix D for each operating data G, $T_{mod}$, $\pi$, $\nu$ relative to the average overall solar radiation G, the average temperature $T_{mod}$, the solar height $\alpha$ and the solar azimuth $\nu$. Subsequently, the values relating to each operating data G, $T_{mod}$, $\pi$, $\nu$ are ordered in monotone series and the above-mentioned intervals are defined.

In other words, at the moment of initialisation of the power matrix A1 and of the efficiency matrix A2, they are empty tables wherein each row represents a range of values relating, respectively, to the average temperature $T_{mod}$ and the solar azimuth $\nu$ and wherein each column represents, respectively, a range of values relating, respectively, to the overall solar radiation G and the solar height $\alpha$.

The power matrix A1 and the efficiency matrix A2 are populated in a progressive manner through iterative steps of the method, in particular using as input the data sets contained in the training matrix D.

The method comprises a step of entering the electrical power value $P_m$, recorded of a set, in an cell for insertion of the power matrix A1 having coordinates corresponding, respectively, to the value of the overall solar radiation G and the average temperature $T_{mod}$ recorded for the same set of operating data G, $T_{mod}$, $\alpha$, $\nu$, $P_m$. In more detail, for each recording of a set of operating parameters G, $T_{mod}$, $\alpha$, $\nu$, $P_m$, after the step of applying the acceptance conditions and checking compliance of these conditions by the set, the value of the electrical power $P_m$ is boxed in the power matrix A1.

In particular, the electrical power value $P_m$ is inserted in a cell having coordinates equal to the value of the overall solar radiation G and the average temperature $T_{mod}$ of the same set. More in detail, the electrical power value $P_m$ is inserted in the cell of the power matrix A1 identified by intervals of values of overall solar radiation G and average temperature values $T_{mod}$ which contain the values corresponding to the average overall solar radiation G and the average temperature $T_{mod}$ of the same set.

If, for example, the overall radiation value G is 600 W/m² and the average temperature value $T_{mod}$ is equal to 40° C., the value of the electrical power $P_m$ will be inserted in the power matrix A1 in the row corresponding to the range of values of average temperature $T_{mod}$ containing the value 40° C. and in the column corresponding to the range values of global radiation G containing the value 600 W/m². In this way, the insertion cell for the electrical power value $P_m$ will be identified.

In this situation, if in the cell for insertion of the power matrix A1 there is a previous value relative to an average power $P_{Mean}$, the method comprises a step of updating the value of the average power $P_{Mean}$ using the electrical power value $P_m$ recorded and recording the updated average power value $P_{Mean}$ in the insertion cell.

In other words, at the moment of entering the power value $P_m$ in the suitable cell of the power matrix A1, this value is used to update the average already present in the insertion cell and the new value of the average $P_{Mean}$ obtained is recorded in the cell. In order to perform this updating of the average $P_{mean}$ it is always necessary that the total number of insertions in the same cell is known from the start of the step for populating the matrix A1.

If, for example, the electrical power value $P_m$ is 312 kW and the value contained in the respective insertion cell is 315 kW, the latter determined starting from two previous insertions in the same cell, the value in that cell at the end of the average operations will be approximately 314 kW. In this way, the power matrix A1 is progressively populated. Each time a power value $P_m$ is recorded, it is placed in a suitable cell of the power matrix A1 and the average of the cell is recalculated and recorded in the cell.

In order to derive a precise average value, each time a power value $P_m$ is inserted in a cell, before the step of calculating an average $P_{Mean}$, the value contained in said cell is multiplied by the numerosity of data previously housed in the cell. In this situation, the power value $P_m$ just inserted is added to the previous value of power in the cell multiplied by its numerosity and subsequently divided by the increased numerosity of a unit. In other words, a weighted average is calculated.

In order to keep track of the numerosity of data inserted in a same cell of the power matrix A1, a first counter matrix N1 is initialised having a plurality of rows and columns each representing the same intervals of the plurality of columns and rows of the power matrix A1. In that way, each time a power value $P_m$ is inserted in a cell of the power matrix A1, the value contained in the first counter matrix N1 in the corresponding cell is increased by a unit.

In other words, each time a power value $P_m$ is inserted in a cell of the power matrix A1, the value contained in the first counter matrix N1 in the cell having coordinates defined by the value of the average overall solar radiation G and the average temperature $T_{mod}$ of the power $P_m$, is increased by a unit. In that way, the first counter matrix N1 is a matrix containing the values of numerosity relative to the data contained in each cell of the power matrix A1.

The method then comprises a step of dividing the power value $P_m$, just inserted in the power matrix A1, by the value of the average $P_{Mean}$ obtained in the calculation step in such a way as to obtain an efficiency value п . For example, if the electrical power value $P_m$ is 100 kW and the average value $P_{Mean}$ is 110 kW, the п efficiency value will be 0.91.

In this situation, the method comprises a step of entering the efficiency value п , just obtained, in a cell for entering the efficiency matrix A2 having coordinates corresponding, respectively, to the value of the solar height $\alpha$ and of the solar azimuth $v$ recorded in the step of recording the same set of operating data.

More in detail, the efficiency value п is inserted in the cell of the efficiency matrix A2 identified by intervals of solar height values $\alpha$ and solar azimuth values $v$ which contain the values corresponding to the solar height $\alpha$ and the solar azimuth $v$ of the same set.

If, for example, the value of the solar height $\alpha$ is equal to 30° and the value of the solar azimuth $v$ is equal to 15°, the value of the efficiency п will be inserted in the efficiency matrix A2 in the row corresponding to the range of values of solar azimuth $v$ containing the value 15° and in the column corresponding to the range of values of solar height $\alpha$ containing the value 30°. In this way the insertion cell for the efficiency value п will be identified.

In this situation, if in the insertion cell there is a previous value relative to an average efficiency $п_{Mean}$, the method comprises a step of updating the value of the average efficiency $п_{Mean}$ by means of the efficiency value п and a step of recording, in the insertion cell, the updated value of the average efficiency ($п_{Mean}$).

In order to perform this updating of the average it is always necessary for the total number of insertions in the same cell to be known from the start of the step for populating the matrix A2.

Subsequently, the method comprises a step of recording the average $п_{Mean}$ in the identified insertion cell of the power matrix A2.

If, for example, the value present in the insertion cell is 0.85 and the value to be inserted in the insertion cell is equal to 0.82, the latter determined starting from two previous insertions in the same cell, the value present in that cell at the end of the average operations will be equal to approximately 0.84.

In order to derive an average value, when each efficiency value п is inserted in an insertion cell, before the step of calculating an average $п_{Mean}$, the value contained in said cell is multiplied by the numerosity of data previously housed in the cell. In this situation, the efficiency value п just inserted is added to the value of the cell multiplied by its numerosity and subsequently divided by the increased numerosity of a unit. In other words, a weighted average is calculated.

In order to keep track of the numerosity of data inserted in a same cell of the efficiency matrix A2, a second counter matrix N2 is initialised having a plurality of rows and columns each representing the same intervals of the plurality of columns and rows of the efficiency matrix A2. In this way, each time an efficiency value п is inserted in a cell of the efficiency matrix A2, the value contained in the second counter matrix N2 in the corresponding cell is increased by a unit.

In other words, each time an efficiency value п is inserted in a cell of the efficiency matrix A2, the value contained in the second counter matrix N2 in the cell having coordinates defined by the value of the solar height $\alpha$ and the solar azimuth $v$ of the same set of operating data is increased by a unit. In that way, the second counter matrix N2 is a matrix containing the values of numerosity relative to the data contained in each cell of the efficiency matrix A2.

The steps of entering and calculating the values within the power and efficiency matrices A1, A2 continue for each set of operating data G, $T_{mod}$, $\alpha$, $v$, $P_m$ present in the training matrix D, that is to say, for each set of operating data considered valid by the acceptance conditions.

The steps of the method from the recording step to the step of calculating an average $п_{Mean}$ and updating the value of the respective box of the efficiency matrix A2 are repeated until an interruption criterion is verified and the power matrix A1 and the efficiency matrix A2 are sufficiently populated. In particular, these steps constitute a part of the method in which the method is "trained".

The training of the method may be considered completed when a predetermined interruption criterion is verified.

In more detail, parallel to the steps of populating the power matrix A1 and the efficiency matrix A2, the method may comprise the steps of identifying a power value $P_{A1}$ contained in a cell of the power matrix A1 identified by intervals of values of overall solar radiation G and of temperature values $T_{mod}$ which contain the values corresponding to the overall solar radiation G and the temperature $T_{mod}$ of the same set of operating data.

Subsequently, the method comprises a step of identifying an efficiency value $п_{A2}$ contained in a cell of the efficiency matrix A2 identified by intervals of solar height values $\alpha$ and solar azimuth values $v$ which contain the values corresponding to the solar height $\alpha$ and solar azimuth $v$ of the same set of operating data.

Subsequently, the method comprises a step of multiplying the power value $P_{A1}$ identified in this way with the efficiency value $п_{A2}$ identified to derive an expected electrical power value P. The method also comprises a step of calculating a relative error between the expected electrical power $P_a$ the electrical power $P_m$ recorded.

Preferably, the relative errors calculated for each set of operating data G, $T_{mod}$, $\alpha$, $v$, $P_m$ are inserted in an error matrix R together with the values of the expected electrical power $P_m$ and of the electrical power $P_m$ recorded and a statistical analysis of their distribution is performed in such a way as to verify an interruption criterion as a function of the relative error between the expected power $P_a$ and the recorded electrical power $P_m$.

If a distribution of errors associated with the data is noted which does not allow the fixed interruption criterion to be checked, the training of the method will not be considered valid and it will be necessary to increase the number of data sets of operating data G, $T_{mod}$, $\alpha$, $v$, $P_m$ for the training.

Preferably, for each analysis verifying the interruption criterion it will be possible, for example, to increase or decrease the rows and the columns of the power matrix A1 and of the efficiency matrix A2, that is to say, it will be necessary to concentrate and/or expand the respective ranges of values, in such a way as to analyse the possibility of reducing the relative errors of the data of the error matrix R.

If, on the other hand, the interruption criterion is verified, the training of the method and the above-mentioned steps of calculating the expected power $P_a$ and the relative error can terminate. In particular, these steps terminate when a fixed percentage of the data of the error matrix R (usually 80%) has a relative error value less than a fixed limit threshold defining the interruption criterion. In this situation, the method will be able to provide, starting from a set of operating data G, $T_{mod}$, $\alpha$, $v$, $P_m$, a expected electrical power value $P_a$ which, for example for 80% of the times, will forecast in a reliable and trustworthy manner the power actually produced by the photovoltaic plant 100.

In other words, in this situation the training of the method and the population of the power matrix A1 and of the efficiency matrix A2 can be considered completed and the method can be considered sufficiently valid for implementing a forecast of the electrical power of the photovoltaic plant 100.

At this point, the method comprises steps of actual forecasting of the electrical power produced in real time by the photovoltaic plant 100.

In more detail, the method comprises a step of acquiring, in real time, the set of operating data G, $T_{mod}$, $\alpha$, $v$, $P_m$ of the photovoltaic plant 100.

The method comprises a step of identifying a power value $P_{A1}$ contained in a cell of said power matrix A1 identified by intervals of overall solar radiation values G and average temperature values $T_{mod}$ which contain the values of average overall solar radiation G and of average temperature $T_{mod}$ acquired in real time.

If, for example, the set of operating data acquired has a power value $P_m$ equal to 150 kW, an overall solar radiation value of 350 W/m², an average temperature value $T_{mod}$ equal to 25° C., a solar height value equal to 55° and a solar azimuth value $v$ equal to 15°, the power value $P_{A1}$, identified in the power matrix A1, will be the one having coordinates identified by the temperature intervals $T_{mod}$ of 20-30° C. and overall solar radiation G of 300-400 W/m².

Subsequently, the method comprises a step of identifying an efficiency value $p_{A2}$ contained in a cell of the efficiency matrix A2 identified by intervals of solar height values $\alpha$ and solar azimuth values $v$ which contain the values of solar height $\alpha$ and solar azimuth $v$ acquired in real time.

With reference to the above-mentioned example, the efficiency value $p_{A2}$, contained in the efficiency matrix A2 will be that having identified from the intervals equal to $\alpha$ contained in the range 50-60° and $v$ contained in the range of 10-20°.

After identifying the power $P_{A1}$ and efficiency $p_{A2}$ values within the power and efficiency matrices A1, A2, the method comprises a step of multiplying the power $P_{A1}$ and the efficiency value $p_{A2}$ value to derive an expected electrical power value $P_a$.

Preferably, in order to increase the accuracy of the expected electrical power value $P_a$, the power value $P_{A1}$, identified in the power matrix A1, may be extrapolated by actuating a bilinear interpolation of the cells from the power matrix A1 adjacent to the cell identified.

Figure 2A:
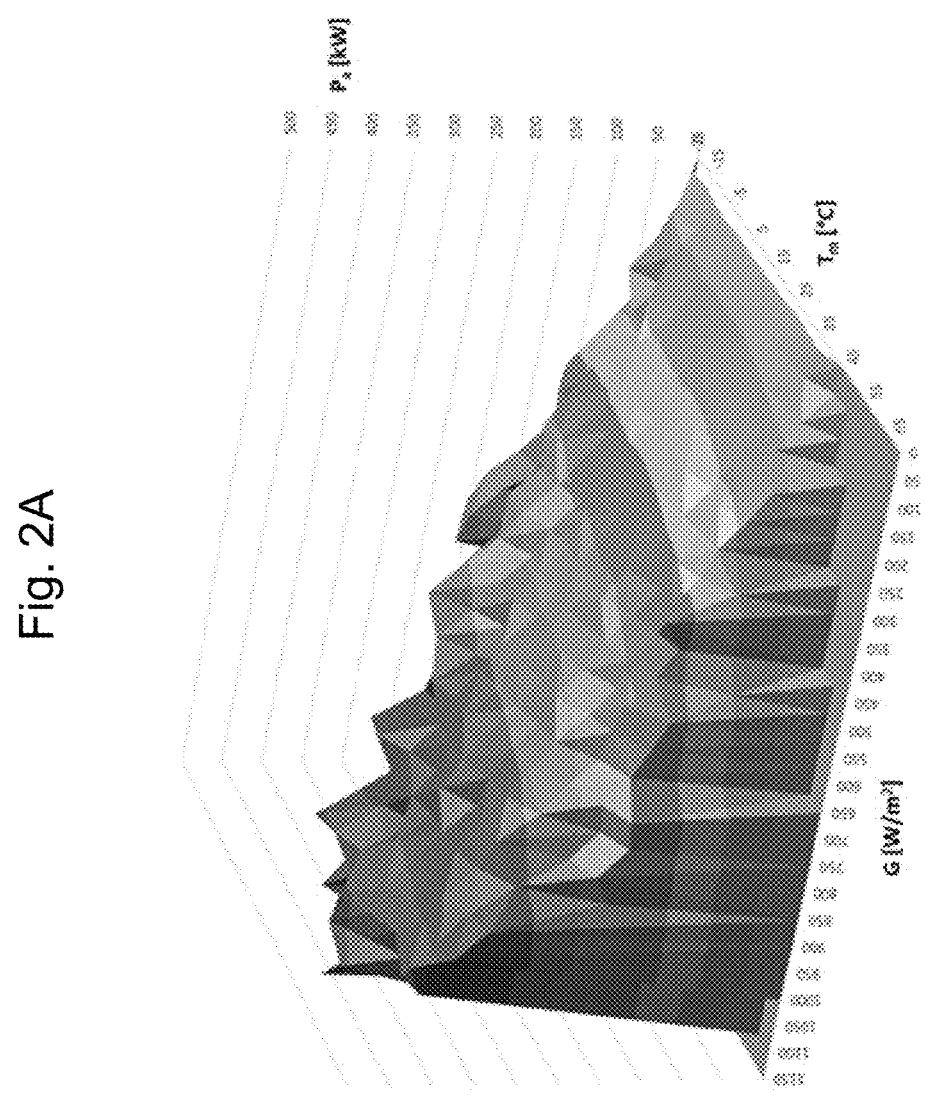
Figure 2B:
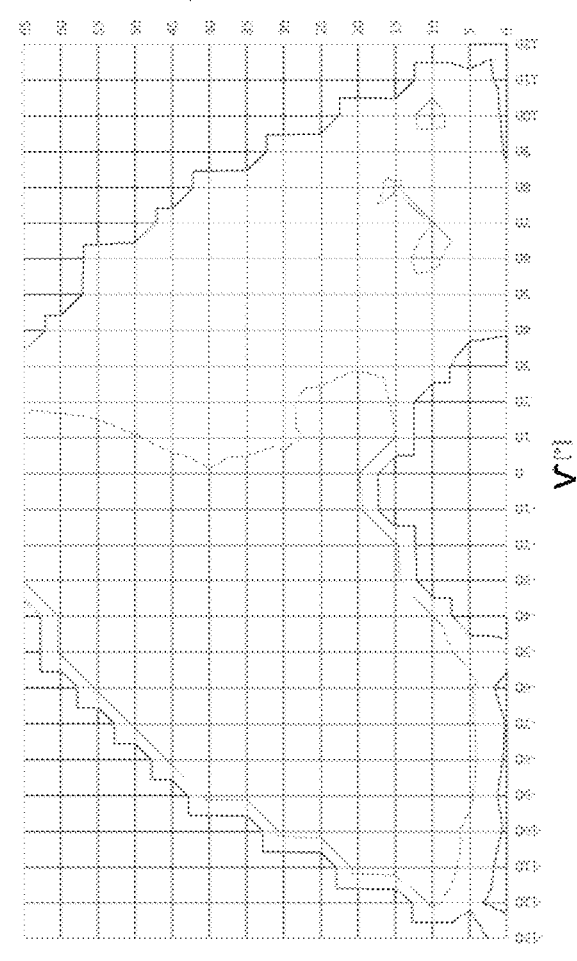

In the same way, the efficiency value $p$ A2, identified in the efficiency matrix A2, may be extrapolated by actuating a bilinear interpolation of the cells from the efficiency matrix A2 adjacent to the cell identified (FIGS. 2A and 2B).

More generally speaking, the power value $P_{A1}$ and efficiency value $p_{A2}$ may be obtained by implementing a wide range of bilinear interpolation methods of the values contained in the matrices A1, A2.

Advantageously, the fact that the method operates by means of matrixes makes it easy to understand and fast to implement.

The value of expected electrical power $P_a$ obtained is then compared with the corresponding electrical power value $P_m$ acquired in real time (equal to 150 W in the example described above).

In this situation, the method comprises a step of identifying an operating condition of the photovoltaic plant 100 as a function of the comparison and a step of sending an alarm signal if an operating condition is identified representing a malfunction of the photovoltaic plant 100.

Advantageously, the expected electrical power value $P_a$ is calculated using values which are able to represent an operation of the photovoltaic plant 100 in the condition of maximum performance possible. These values take into consideration the effect of the environmental characteristics in which the photovoltaic plant 100 is installed such as, for example, height and position of buildings which cause shadows, geometry and distance between the strings of modules 10 and the like.

The power $P_{A1}$ and efficiency $p_{A2}$ values therefore take into account, respectively, the nature of the plant and the effect of the fixed shading in a so-called "as built" condition of the photovoltaic plant 100.

The values of the expected electrical power $P_a$, obtained from the method, are values which are able to reflect the operation of the photovoltaic plant 100 in the condition in which it operates at the maximum possible performance levels, that is to say, in the maximum operating condition of the plant 100 as constructed and in its actual operating conditions. In this situation, therefore, the expected electrical power values $P_a$ obtained take into account factors such as the presence of fixed shadows on its modules 10, the position of the modules 10, the site in which the photovoltaic plant 100 is installed and the like.

Thanks to the implementation of the method, according to the invention, it is possible to take into consideration, in the calculation of the expected power $P_a$, aspects impacting the performance of the photovoltaic plant 100.

In other words, the value of the expected electrical power $P_a$, obtained by multiplying a respective value in the power matrix A1 with a respective value in the efficiency matrix A2, takes into consideration all the aspects of the photovoltaic plant (such as the position, the presence of shadows due to surrounding buildings, the positioning of the modules etc) which constantly and repeatedly influence its production of electrical power $P_m$.

According to another aspect of the invention, the processing unit 20 of the plant is configured to implement the method, according to the invention, for each group of modules 10 connected to an inverter of the photovoltaic plant 100.

Advantageously, thanks to the above-mentioned aspect, it is possible to monitor and forecast the electrical power output from a single group of modules 10, that is to say, it is possible to "divide" the photovoltaic plant 100 and monitor only a part of it.

The invention achieves the preset aims eliminating the drawbacks of the prior art.

In particular, the method is easy and fast to implement in fact as it is not based on an Artificial Intelligence system but consists of a system of simple matrices to be implemented with any programming language without the use of payment libraries.

Advantageously, the method is able to take into consideration aspects which repeatedly influence the electrical power which can be produced by the plant in such a way as to obtain expected, accurate and reliable electrical power values for that plant.

Advantageously, the method is quick and easy to implement.

Advantageously, the method does not require specific software and/or platforms to operate and may therefore be implemented in central platforms in the cloud.

Advantageously, the implementation of the method occurs by using matrices and, therefore, the method itself provides simpler and more immediate management with respect to an implementation using neural or artificial intelligence networks, even though equally reliable.

Advantageously, the method is fully automated and does not require a data analyst for its operation and it therefore lends itself to being implemented in platforms centralised in the cloud.

Advantageously, the method is fast in analysing data and is able to reach extremely high accuracy in the forecasting of the electrical power expected at the output from the photovoltaic plant.

The invention claimed is:

1. A method for providing electrical power in real time of a photovoltaic plant comprising the steps of:
   providing that said photovoltaic plant comprises a plurality of photovoltaic modules interconnected with each other, a plurality of sensors each operatively connected with at least one of said plurality of photovoltaic modules, a plurality of inverters each operatively connected with a respective group of said plurality of photovoltaic modules and a processing and control unit configured to perform said steps below;
   i. recording, in each predetermined time interval of a recording period, a set of operating data of the photovoltaic plant, said set of operating data comprising at least:
      an average overall solar radiation received from the photovoltaic plant;
      an average temperature of modules of the photovoltaic plant;
      a solar height with respect to the photovoltaic plant;
      a solar azimuth with respect to the photovoltaic plant;
      an electrical power output from the photovoltaic plant;
   said step of recording the set of operating data of the photovoltaic plant being performed by acquiring at least some data of the set of operating data at least by said plurality of sensors;
   at the end of the recording period the method comprising the steps of:
   ii. initializing a power matrix and an efficiency matrix, said power matrix having a plurality of columns each representing a range of global solar radiation values and a respective plurality of rows each representing a range of average temperature values, said efficiency matrix having a plurality of columns each representing a range of solar height values and a respective plurality of rows each representing a range of solar azimuth values;
   iii. entering for each set of operating data a respective electrical power value recorded in a cell for inserting in said power matrix having coordinates corresponding, respectively, to the value of the average overall solar radiation and the average temperature recorded for the same set of operating data;
   iv. if in said insertion cell there is a previous value relative to an average power, updating the value of the average power using the electrical power value recorded and recording the updated average power value in said insertion cell;

v. dividing said recorded electrical power value by said updated average power to obtain an efficiency value;
   vi. inserting said efficiency value in a cell of said efficiency matrix having coordinates corresponding, respectively, to the value of the solar height and of the solar azimuth recorded for the same set of operating data;
   vii. if in said insertion cell there is a previous value relative to an average efficiency, updating the value of the average efficiency with said efficiency value and recording, in said insertion cell, the updated value of the average efficiency;
   viii. repeating the steps from iii to vii until an interruption criterion is verified;
   the method then comprises the following steps:
   ix. acquiring, in real time, the set of operating data of the photovoltaic plant;
   x. identifying a power value contained in a cell of said power matrix identified by intervals of overall solar radiation values and average temperature values which contain the values corresponding to said average overall solar radiation and to said average temperature acquired in real time;
   xi. identifying a further efficiency value contained in a cell of said efficiency matrix identified by intervals of solar height values and solar azimuth values which contain the values corresponding to said solar height and to said solar azimuth acquired in real time;
   xii. multiplying said power value and said further efficiency value to derive an expected electrical power value;
   xiii. comparing said expected electrical power value with the corresponding electrical power value acquired in real time;
   xiv. identifying an operating condition of the photovoltaic plant as a function of said comparison;
   xv. sending an alarm signal if an operating condition is identified representing a malfunction of said photovoltaic plant.

2. The method according to claim 1, wherein said recording step comprises the sub-steps of storing each set of operating data in a respective row of a storage matrix.

3. The method according to claim 2, wherein, after said recording step, the method further comprises the steps of:
   defining a plurality of conditions of acceptance of the values contained in each set of operating data recorded;
   applying said plurality of conditions of acceptance to each row of said storage matrix to cause an acceptance or a rejection of said set;
   creating a training matrix containing, in each row, a set of operating data of said storage matrix respecting the acceptable conditions.

4. The method according to claim 1 and further comprising the steps of:
   initializing a first counter matrix and a second counter matrix, said first counter matrix having a plurality of columns and a plurality of rows representing the same intervals as said plurality of columns and rows of the power matrix, said second counter matrix having a plurality of columns and a plurality of rows representing the same intervals as said plurality of columns and rows of the efficiency matrix; and for each set of operating data:
   increasing by a unit the value contained in a cell having coordinates defined by the value of the average overall solar radiation and the average temperature recorded for said set of operating data;

increasing by a unit the value contained in a cell having coordinates defined by the value of solar height and the solar azimuth recorded for said set of operating data.

5. The method according to claim 4, wherein said updating steps comprise the following sub-steps:

multiplying the value present in the insertion cell with the value contained in the corresponding cell of the first or second counter matrix;

adding the value obtained from the multiplying step with the value inserted in said power matrix or in said efficiency matrix in the insertion step;

dividing the value obtained by said adding step by the value in said cell of the first or second counter matrix increased by a unit.

6. The method according to claim 1, wherein during said step of repeating the steps from iii to vii, the method also comprises for each set of operating data the steps of:

identifying a power value contained in a cell of said power matrix identified by intervals of overall solar radiation values and average temperature values which contain the values corresponding to said average overall solar radiation and to said average temperature of the same set of operating data;

identifying said further efficiency value contained in a cell of said efficiency matrix identified by intervals of solar height values and solar azimuth values which contain the values corresponding to said solar height and to said solar azimuth of the same set of operating data;

multiplying said power value and said further efficiency value identified to derive an expected electrical power value;

calculating a relative error between said expected electrical power and the electrical power of said set of operating data;

determining the interruption criterion as a function of said relative error.

7. The method according to claim 1, wherein the step of identifying a power value comprises a sub-step of interpolating said power value with power values of said power matrix adjacent to the cell containing said power value and wherein said step of identifying said further efficiency value comprises a sub-step of interpolating said further efficiency value with efficiency values of said efficiency matrix adjacent to the cell containing said further efficiency value, the interpolations being bi-linear.

8. A photovoltaic plant for producing electrical power comprising:

a plurality of photovoltaic modules interconnected with each other;

a plurality of sensors each operatively connectedassociated with at least one of said plurality of photovoltaic modules;

a plurality of inverters each operatively connected with a respective group of said plurality of photovoltaic modules;

a processing and control unit configured to perform a method for providing electrical power in real time of the photovoltaic plant comprising the steps of:

i. recording, in each predetermined time interval of a recording period, a set of operating data of the photovoltaic plant, said set of operating data comprising at least:

an average overall solar radiation received from the photovoltaic plant;

an average temperature of modules of the photovoltaic plant:

a solar height with respect to the photovoltaic plant:

a solar azimuth with respect to the photovoltaic plant;

an electrical power output from the photovoltaic plant;

said step of recording the set of operating data of the photovoltaic plant being performed by acquiring at least some data of the set of operating data at least by said plurality of sensors;

at the end of the recording period the method comprising the steps of:

ii. initializing a power matrix and an efficiency matrix, said power matrix having a plurality of columns each representing a range of global solar radiation values and a respective plurality of rows each representing a range of average temperature values, said efficiency matrix having a plurality of columns each representing a range of solar height values and a respective plurality of rows each representing a range of solar azimuth values;

iii. entering for each set of operating data a respective electrical power value recorded in a cell for inserting in said power matrix having coordinates corresponding, respectively, to the value of the average overall solar radiation and the average temperature recorded for the same set of operating data;

iv. if in said insertion cell there is a previous value relative to an average power, updating the value of the average power using the electrical power value recorded and recording the updated average power value in said insertion cell;

v. dividing said recorded electrical power value by said updated average power to obtain an efficiency value;

vi. inserting said efficiency value in a cell of said efficiency matrix having coordinates corresponding, respectively, to the value of the solar height and of the solar azimuth recorded for the same set of operating data;

vii. if in said insertion cell there is a previous value relative to an average efficiency, updating the value of the average efficiency with said efficiency value and recording, in said insertion cell, the updated value of the average efficiency;

viii. repeating the steps from iii to vii until an interruption criterion is verified;

the method then comprises the following steps:

ix. acquiring, in real time, the set of operating data of the photovoltaic plant;

x. identifying a power value contained in a cell of said power matrix identified by intervals of overall solar radiation values and average temperature values which contain the values corresponding to said average overall solar radiation and to said average temperature acquired in real time;

xi. identifying a further efficiency value contained in a cell of said efficiency matrix identified by intervals of solar height values and solar azimuth values which contain the values corresponding to said solar height and to said solar azimuth acquired in real time;

xii. multiplying said power value and said further efficiency value to derive an expected electrical power value;

xiii. comparing said expected electrical power value with the corresponding electrical power value acquired in real time;

xiv. identifying an operating condition of the photovoltaic plant as a function of said comparison;

xv. sending an alarm signal if an operating condition is identified representing a malfunction of said photovoltaic plant.

9. The photovoltaic plant according to claim 8, wherein said processing and control unit is configured to perform said method for each group of modules connected to an inverter of the plurality of inverters of said photovoltaic plant.

\* \* \* \* \*